US009365363B2

(12) United States Patent
Kim et al.

(10) Patent No.: US 9,365,363 B2
(45) Date of Patent: Jun. 14, 2016

(54) BAGGAGE JAMMING PREVENTION STRUCTURE AND BELT CONVEYOR DEVICE INCLUDING SAME

(71) Applicant: KOREA AIRPORTS CORPORATION, Seoul (KR)

(72) Inventors: Dong Soo Kim, Gimpo-si (KR); Gi Young Do, Gimpo-si (KR)

(73) Assignee: KOREA AIRPORTS CORPORATION (KR)

( * ) Notice: Subject to any disclaimer, the term of this patent is extended or adjusted under 35 U.S.C. 154(b) by 0 days.

(21) Appl. No.: 14/653,024

(22) PCT Filed: Dec. 17, 2013

(86) PCT No.: PCT/KR2013/011724
§ 371 (c)(1),
(2) Date: Jun. 17, 2015

(87) PCT Pub. No.: WO2014/098442
PCT Pub. Date: Jun. 26, 2014

(65) Prior Publication Data
US 2015/0336749 A1    Nov. 26, 2015

(30) Foreign Application Priority Data
Dec. 21, 2012  (KR) .......... 10-2012-0150728

(51) Int. Cl.
*B65G 47/66* (2006.01)
*B64F 1/36* (2006.01)

(52) U.S. Cl.
CPC ............... *B65G 47/66* (2013.01); *B64F 1/368* (2013.01); *B65G 2201/0264* (2013.01)

(58) Field of Classification Search
CPC .. B65G 47/66; B65G 2201/0264; B64F 1/368
USPC ........................................... 198/600
See application file for complete search history.

(56) References Cited

U.S. PATENT DOCUMENTS

| 2,536,961 A | * | 1/1951 | Smith .............. A47F 9/04 186/68 |
| 2,624,444 A | * | 1/1953 | Casabona .......... B65G 47/66 198/560 |

(Continued)

FOREIGN PATENT DOCUMENTS

| CA | 2755249 | 9/2010 |
| CN | 102596767 | 7/2012 |

(Continued)

OTHER PUBLICATIONS

International Search Report—PCT/KR2013/011724 dated Feb. 13, 2014.

(Continued)

*Primary Examiner* — Mark A Deuble
(74) *Attorney, Agent, or Firm* — Cantor Colburn LLP

(57) ABSTRACT

A structure for suppressing a baggage jam, includes: a jam suppressing unit which is provided at a gap between a first conveyor and a second conveyor to suppress baggage transferred from the first conveyor to the second conveyor from being jammed in the gap, and the jam suppressing unit may be provided to be protruded to a position higher than a jam threshold point having the narrowest space in the gap and to a position lower than a transport surface on which the baggage is transported by the first and second conveyors.

5 Claims, 6 Drawing Sheets

(56) References Cited

U.S. PATENT DOCUMENTS

| | | | | | |
|---|---|---|---|---|---|
| 3,202,260 | A | * | 8/1965 | Wolf | B26D 7/32 198/560 |
| 3,556,278 | A | * | 1/1971 | Mastracci | B65G 47/66 198/600 |
| 3,669,239 | A | * | 6/1972 | Martin | B65G 47/66 198/483.1 |
| 4,934,513 | A | * | 6/1990 | Kirkpatrick | B65G 47/66 198/612 |
| 5,971,129 | A | * | 10/1999 | Stawniak | B66B 29/08 198/324 |
| 2010/0108467 | A1 | * | 5/2010 | Barreyre | B60S 3/004 198/599 |
| 2010/0230247 | A1 | * | 9/2010 | McKee | B65G 47/66 198/804 |

FOREIGN PATENT DOCUMENTS

| | | | | |
|---|---|---|---|---|
| DE | 3217475 A1 | * | 11/1983 | B65G 47/66 |
| GB | 2139591 A | * | 11/1984 | B65G 47/66 |
| JP | 09290916 | | 11/1997 | |
| JP | 2000177836 | | 6/2000 | |
| JP | 2012006679 | | 1/2012 | |
| WO | 2010105199 | | 9/2010 | |

OTHER PUBLICATIONS

Chinese Office Action—Chinese Application No. 201380066350.1 issued on Jan. 4, 2016, citing JPH09290916, CA2755249, JP2000177836, JP2012006679 and CN102596767.

* cited by examiner

BAGGAGE JAMMING PREVENTION STRUCTURE AND BELT CONVEYOR DEVICE INCLUDING SAME

TECHNICAL FIELD

The embodiments described herein pertain generally to a structure for suppressing a baggage jam and a belt conveyor device including the same.

BACKGROUND

Generally, a belt conveyor system configured to transport baggage includes multiple conveyors aligned in series. A head pulley is provided at a front end of a conveyor and a tail pulley is provided at a rear end thereof. A drive combined with a roller device is provided at the center of the conveyor such that the drive can receive a driving force from a motor. Further, a belt provided at the tail pulley and the head pulley is rotated by power of the motor. Baggage placed on the belt is transported from the rear end at which the tail pulley is provided to the front end at which the head pulley is provided. After the baggage is transported to the front end of the conveyor, the conveyor transfers the baggage on the belt to another conveyor subsequent thereto at a speed corresponding to a rotation speed of the belt.

However, in a conventional belt conveyor system, multiple conveyors are consecutively aligned in series. Therefore, there is a gap between the multiple conveyors, specifically, between a tail pulley of a conveyor positioned at the former part and a head pulley of a conveyor positioned at the latter part. Thus, baggage may be jammed in the gap.

For example, when a bag is transported, a strap of the bag may be jammed in the gap.

If a strap of the bag is jammed in the gap, a downward frictional force is first applied to the strap of the bag by rotation of a belt of the conveyor positioned at the latter part. Then, the bag is transferred to a belt of the conveyor positioned at the former part. Thus, an upward frictional force and a pulling force are applied to the strap of the bag. Generally, such upward frictional force and pulling force enable the strap of the bag to get out of the gap before the strap of the bag is jammed in the narrowest point of the gap.

However, the strap of the bag may droop to be lower than the narrowest point of the gap by the downward frictional force before the upward frictional force and the pulling force are applied to the strap of the bag. In this case, the strap of the bag is applied with the upward frictional force and the pulling force for pulling up the strap of the bag. Even when such forces are applied, if the strap of the bag is twisted at a certain angle, the twisted strap of the bag cannot pass through the narrowest point of the gap and thus is often jammed therein.

As such, a part of the baggage may be jammed in the gap, and, thus, the baggage cannot be transported. Therefore, as for an airport conveyor, such a problem causes delays of flights. Further, if other baggage following the jammed baggage is caught and stacked, the overall transport of baggage may be interrupted. The whole baggage may be applied as an overload to a motor device, and, thus, the motor device may break down. Therefore, the entire belt conveyor system cannot be further used.

DISCLOSURE OF THE INVENTION

Problems to be Solved by the Invention

The present disclosure relates to a structure for suppressing a baggage jam to be applied to a belt conveyor device in which multiple conveyors are aligned, and a belt conveyor device including the same.

Means for Solving the Problems

In view of the foregoing, a first exemplary embodiment of the present disclosure provides a structure for suppressing a baggage jam, including: a jam suppressing unit which is provided at a gap between a first conveyor and a second conveyor to suppress baggage transferred from the first conveyor to the second conveyor from being jammed in the gap, and the jam suppressing unit may be provided to be protruded to a position higher than a jam threshold point having the narrowest space in the gap and to a position lower than a transport surface on which the baggage is transported by the first and second conveyors.

A second exemplary embodiment of the present disclosure provides a belt conveyor device comprising the structure for suppressing a baggage jam of a first exemplary embodiment of the present disclosure.

Effect of the Invention

According to any one of the above-described exemplary embodiments, it is possible to suppress the baggage from being jammed in the gap between the first conveyor and the second conveyor with the jam suppressing unit which is provided to be protruded to a position higher than the jam threshold point where a part or whole of the baggage is jammed.

MODE FOR CARRYING OUT THE INVENTION

Figure 1:
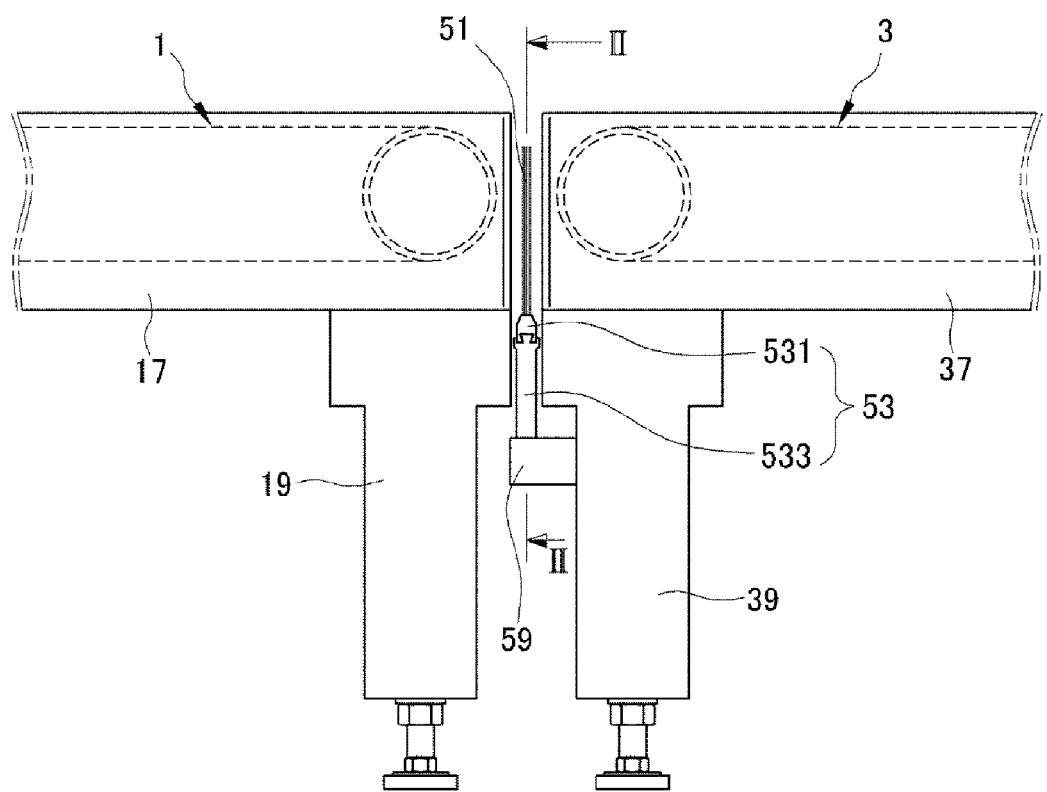
FIG. 1 is a schematic side view of a belt conveyor device provided with a structure for suppressing a baggage jam, in accordance with an exemplary embodiment described herein.

Hereinafter, embodiments of the present disclosure will be described in detail with reference to the accompanying drawings so that the present disclosure may be readily implemented by those skilled in the art. However, it is to be noted that the present disclosure is not limited to the embodiments but can be embodied in various other ways. In drawings, parts irrelevant to the description are omitted for the simplicity of explanation, and like reference numerals denote like parts through the whole document.

Through the whole document, the term "connected to" or "coupled to" that is used to designate a connection or coupling of one element to another element includes both a case that an element is "directly connected or coupled to" another element and a case that an element is "electronically connected or coupled to" another element via still another element.

Through the whole document, the term "on" that is used to designate a position of one element with respect to another element includes both a case that the one element is adjacent to the another element and a case that any other element exists between these two elements.

Further, the term "comprises or includes" and/or "comprising or including" used in the document means that one or more other components, steps, operation and/or existence or addition of elements are not excluded in addition to the described components, steps, operation and/or elements unless context dictates otherwise. The term "about or approximately" or "substantially" is intended to have meanings close to numerical values or ranges specified with an allowable error and intended to prevent accurate or absolute numerical values disclosed for understanding of the present disclosure from being illegally or unfairly used by any unconscionable third party. Through the whole document, the term "step of" does not mean "step for".

Through the whole document, the term "combination of" included in Markush type description means mixture or combination of one or more components, steps, operations and/or elements selected from a group consisting of components, steps, operation and/or elements described in Markush type and thereby means that the disclosure includes one or more components, steps, operations and/or elements selected from the Markush group.

For reference, in the explanation of the exemplary embodiments, the terms (upper side, upward side, etc.) related to directions or positions are defined with reference to arrangement of respective components illustrated in the drawings. By way of example, referring to FIG. 1 to FIG. 5, generally, a side facing in an upward direction may be an upper side or an upward side.

The present disclosure relates to a structure for suppressing a baggage jam to be applied to a belt conveyor device in which multiple conveyors are aligned, and a belt conveyor device including the same.

However, the present disclosure is applied not only to a baggage transport and receipt system, but also to a transport and receipt system for various items other than baggage. That is, herein, the term "baggage" may lexically refer to baggage and also refer to various items which need to be transported and received.

Hereinafter, a structure for suppressing a baggage jam (hereinafter, referred to as "the present baggage jam suppressing structure") 5 according to an exemplary embodiment of the present disclosure will be described.

Figure 2:
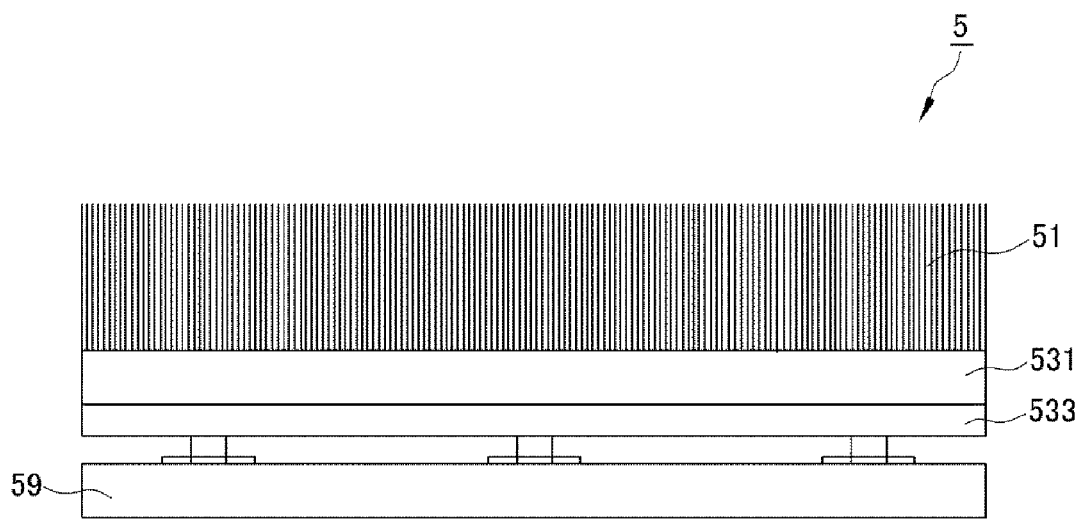
FIG. 2 is a schematic conceptual diagram illustrating a status where a structure for suppressing a baggage jam is provided, in accordance with an exemplary embodiment described herein.
Figure 3:
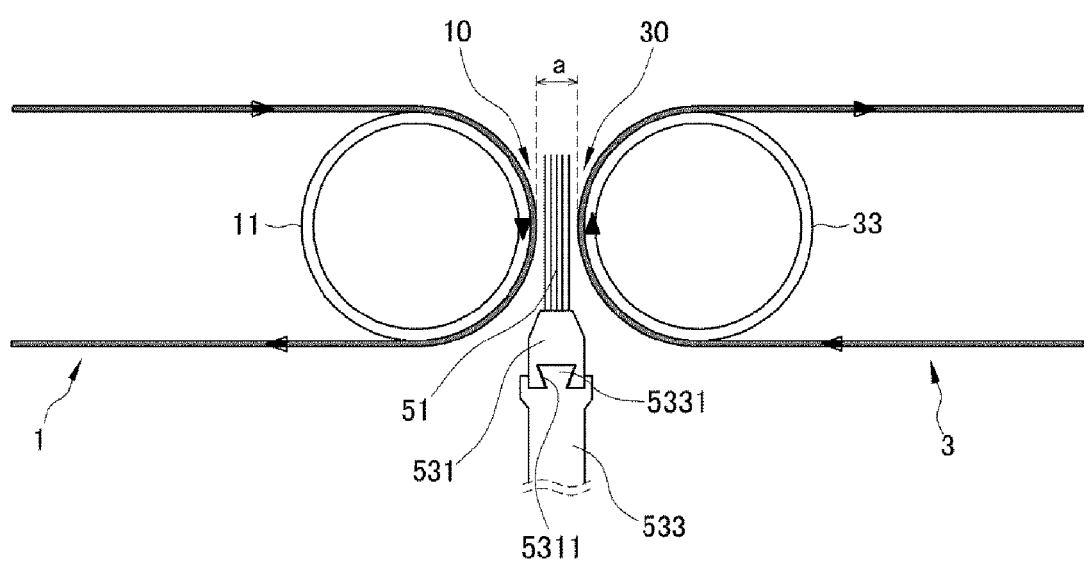
FIG. 3 is a schematic cross-sectional view taken along a line II-II of FIG. 1.
Figure 4:
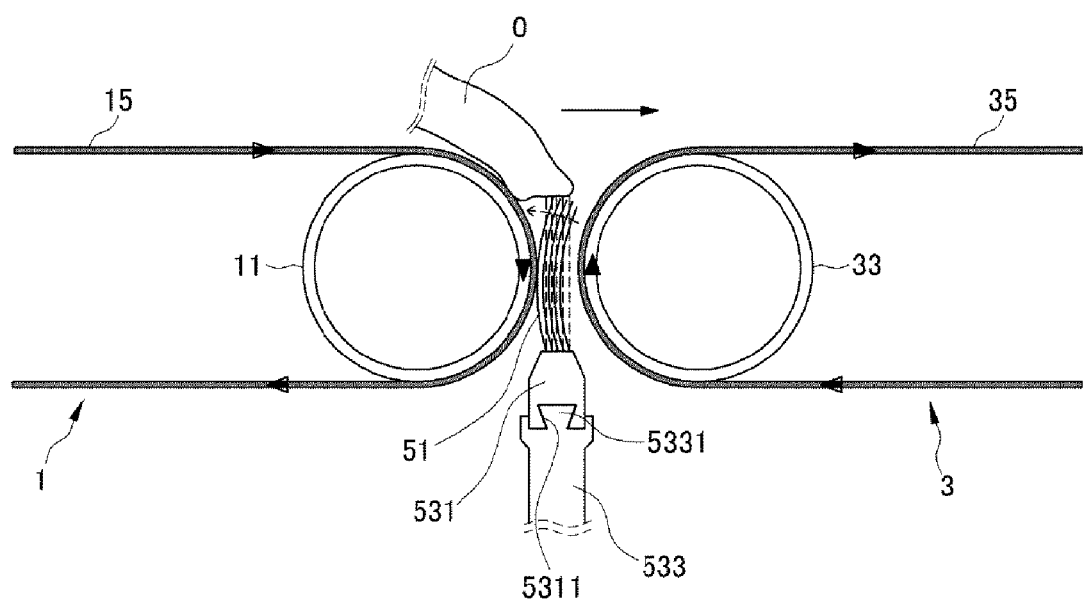
FIG. 4 and FIG. 5 are conceptual diagrams provided to explain an operation of a structure for suppressing a baggage jam, in accordance with an exemplary embodiment described herein.
Figure 5:
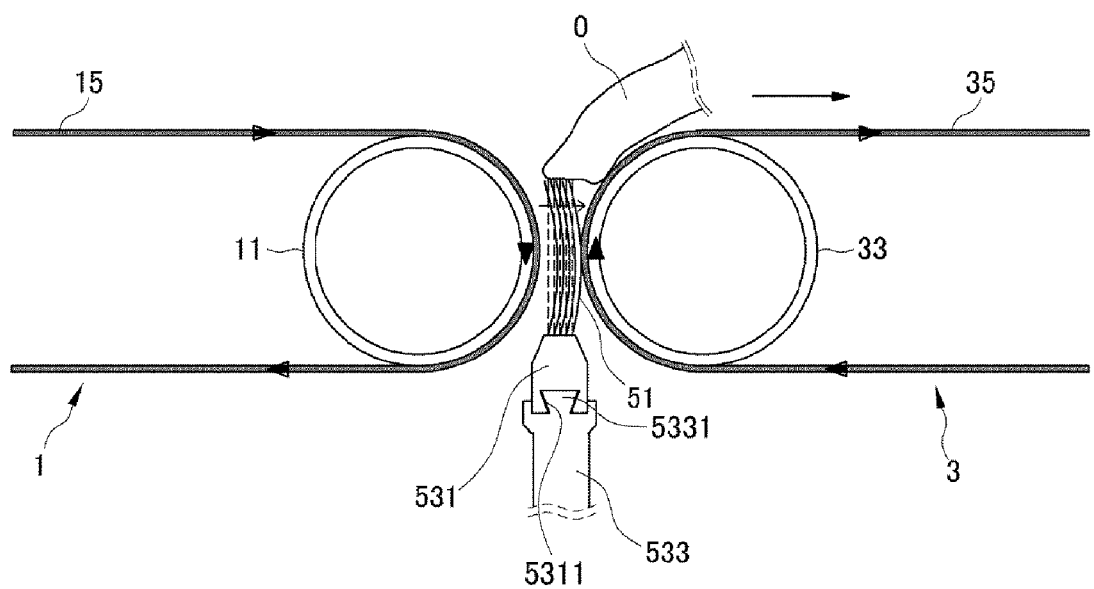
Figure 6:
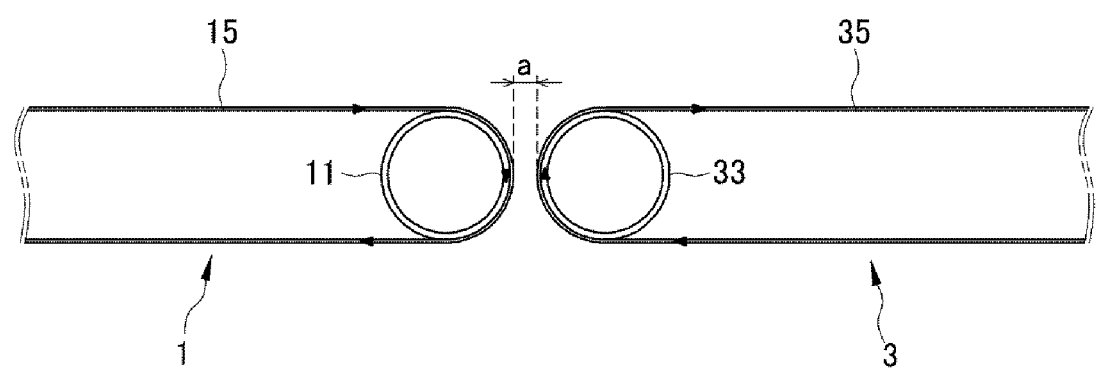
FIG. 6 is a conceptual diagram provided to explain a gap.

FIG. 1 is a schematic side view of a belt conveyor device provided with a structure for suppressing a baggage jam, in accordance with an exemplary embodiment described herein. FIG. 2 is a schematic conceptual diagram illustrating a status where a structure for suppressing a baggage jam is provided, in accordance with an exemplary embodiment described herein. FIG. 3 is a schematic cross-sectional view taken along a line II-II of FIG. 1. FIG. 4 and FIG. 5 are conceptual diagrams provided to explain an operation of a structure for suppressing a baggage jam, in accordance with an exemplary embodiment described herein. FIG. 6 is a conceptual diagram provided to explain a gap.

The present baggage jam suppressing structure 5 includes a jam suppressing unit 51.

Referring to FIG. 1, FIG. 4, and FIG. 5, the jam suppressing unit 51 is provided at a gap between a first conveyor 1 and a second conveyor 3 in order to suppress baggage 0 transferred from the first conveyor 1 to the second conveyor 3 from being jammed in the gap.

As illustrated in FIG. 2, FIG. 4 to FIG. 6, the gap refers to a gap formed between a head pulley 11 of the first conveyor 1 and a tail pulley 33 of the second pulley 3. As illustrated in FIG. 6, the gap has a shape having a narrowest space a on a line connecting the centers of the head pulley 11 and the tail pulley 33 and an increased width from the narrowest space a toward an upper side and a lower side.

Further, referring to FIG. 2, FIG. 4 to FIG. 6, the baggage 0 is transferred from the first conveyor 1 to the second conveyor 3. Thus, at the gap, the head pulley 11 of the first conveyor 1 is rotated toward a lower side (rotated in a clockwise direction with reference to FIG. 2) and the tail pulley 33 of the second conveyor 3 is rotated toward an upper side (rotated in a clockwise direction with reference to FIG. 2).

Conventionally, the baggage 0 may be jammed in the gap.

For example, a case where the baggage 0 is a bag with a strap will be described with reference to FIG. 6. When the bag is transferred from the first conveyor 1 to the second conveyor 3, conventionally, the strap may enter into the gap.

If the strap enters into the gap, a downward frictional force is applied to the strap by a contact with a first belt 15. Then, when the bag is transferred to a second belt 35, an upward frictional force and a pulling force are applied to the strap. The upward frictional force and the pulling force enable the strap of the bag to get out of the gap before the strap is jammed in the narrowest point, i.e., a portion having the narrowest space a.

However, the strap of the bag may droop to be lower than the portion having the narrowest space a in the gap by the downward frictional force before the upward frictional force and the pulling force are applied to the strap of the bag. In this case, the strap of the bag is applied with the upward frictional force and the pulling force for pulling up the strap of the bag. Even when such forces are applied, if the strap of the bag is twisted at a certain angle, the twisted strap of the bag cannot pass through the narrowest point of the gap and thus is often jammed therein. In particular, if the strap is fitted with a hard member such as an iron piece, it is more likely to be jammed.

As such, a part of the baggage 0 such as a bag may be jammed in the gap, and, thus, the baggage 0 cannot be transported. Particularly, if such a problem occurs in an airport conveyor, flights may be delayed.

Further, in a state where the bag is jammed and thus cannot move, the second conveyor 3 pulls the bag, and, thus, a pulling force is continuously applied to the baggage 0. Therefore, the twisted portion of the strap of the bag may be further pressed and thus further jammed in the portion having the narrowest space a.

However, the present baggage jam suppressing structure 5 suppresses the baggage 0 from being jammed in the gap with the jam suppressing unit 51 provided at the gap. Details thereof will be described below.

As illustrated in FIG. 1, FIG. 4 to FIG. 6, the head pulley 11 is covered by the first belt 15 and the tail pulley 33 is covered by the second belt 35. Therefore, the gap may refer to a space between the head pulley 11 of the first conveyor 1 covered by the first belt 15 and the tail pulley 33 of the second conveyor 3 covered by the second belt 35.

For reference, in the present disclosure, the expression "a part or whole of the baggage 0" means that the present disclosure can be applied to all of a case where the baggage 0 is small and thus the whole of the baggage 0 is jammed in the gap and a case where a part the baggage 0 (for example, a strap of a bag) is jammed in the gap. However, generally, the baggage 0 which is small enough to be jammed in the gap in whole is not transported by a conveyor. Therefore, hereinafter, for convenience in explanation, only a case where a part of the baggage 0 is jammed will be described.

The jam suppressing unit 51 is provided to be protruded to a position higher than a jam threshold point. Herein, referring to FIG. 2 and FIG. 6, the jam threshold point refers to the portion having the narrowest space a in the gap.

In other words, the jam threshold point refers to a point where a part of the baggage 0 is jammed in the gap.

That is, as illustrated in FIG. 2, the present baggage jam suppressing structure 5 is provided to be protruded to the position higher than the jam threshold point and thus suppresses a part of the baggage 0 from entering into the jam threshold point. Therefore, the baggage 0 is not jammed therein and can be transferred onto the second conveyor 3 without any obstruction.

Further, referring to FIG. 2, FIG. 4, and FIG. 5, desirably, the jam suppressing unit 51 may be protruded to a position lower than a transport surface on which the baggage 0 is transported by the first conveyor 1 and the second conveyor 3. Herein, the term "transport surface" refers to an upward surface of a belt surface of the first belt 15 or a belt surface of the second belt 35 on which the baggage 0 is placed. This is because if the jam suppressing unit 51 is protruded to be higher than the transport surface, the baggage 0 may be caught by the jam suppressing unit 51 while being transferred from the first conveyor 1 to the second conveyor 3, which may interrupt the transport.

Referring to FIG. 4 and FIG. 5, the jam suppressing unit 51 may be provided in the gap with a thickness smaller than a space of the jam threshold point.

The space of the jam threshold point refers to the narrowest space a in the gap. That is, the jam suppressing unit 51 may be provided in the gap with a thickness smaller than the narrowest space a.

Therefore, it is possible to suppress interference with the jam suppressing unit 51 in the first conveyor 1 and the second conveyor 3. Each of the first conveyor 1 and the second conveyor 3 is operated to transport the baggage 0. For example, referring to FIG. 4 to FIG. 6, the head pulley 11 and a tail pulley (not illustrated in the drawings) of the first conveyor 1 are rotated and operated to rotate the first belt 15. A head pulley (not illustrated in the drawings) and the tail pulley 33 of the second conveyor 3 are rotated and operated to rotate the second belt 35. Herein, the jam suppressing unit 51 considers vibrations caused by the rotation of the first belt 15 and the operation of the head pulley 11 and the tail pulley (of the first conveyor 1). Further, the jam suppressing unit 51 considers vibrations caused by the rotation of the second belt 35 and the operation of the head pulley and the tail pulley 33 (of the second conveyor 3). Therefore, the jam suppressing unit 51 may have a thickness set to minimize interference in the first and second conveyors 1 and 3.

Meanwhile, the thickness of the jam suppressing unit 51 may cause a first gap 10 to be formed between the jam suppressing unit 51 and the first conveyor 1 and may cause a second gap 30 to be formed between the jam suppressing unit 51 and the second conveyor 3, as illustrated in FIG. 2. It is possible to suppress a part of the baggage 0 from being jammed in the first gap 10 and the second gap 30 as described below.

The jam suppressing unit 51 can extend a time for a part or whole of the baggage 0 to reach the jam threshold point with the first gap 10 formed between the jam suppressing unit 51 and the first conveyor 1 or the second gap 30 formed between the jam suppressing unit 51 and the second conveyor 3.

To be specific, if a part or whole of the baggage 0 is in contact with an upper end of the jam suppressing unit 51, the jam suppressing unit 51 is bent and thus can secure a restoring force caused by elastic bending.

Referring to FIG. 4 and FIG. 5, when the jam suppressing unit 51 is bent by a contact with the baggage 0, the restoring force caused by elastic bending may be a force applied to the baggage 0 in the opposite direction to bending of the jam suppressing unit 51 in order to return to the jam suppressing unit 51 to its original position. That is, as illustrated in FIG. 4 and FIG. 5, the jam suppressing unit 51 delays the entrance of a part of the baggage 0 in contact with the jam suppressing unit 51 into the first gap 10 or the second gap 30 by using the restoring force. Therefore, it is possible to extend a time for a part of the baggage 0 to reach the jam threshold point.

At this time, the tail pulley 33 of the second conveyor 3 is operated such that a part or whole of the baggage 0 can get out of the gap within the extended reaching time.

That is, while the reaching time is extended, a part of the baggage 0 may pass through the first gap 10 and the second gap 30 and may be transferred onto the second conveyor 3 by an upward frictional force caused by an upward rotation of the second belt 35 and an upward pulling force caused by an operation of the second conveyor 3.

To be specific, as illustrated in FIG. 4, if a part of the baggage 0 enters into the first gap 10, a downward frictional force caused by the first belt 15 is applied to the part of the baggage 0 entering into the first gap 10. The entrance of the part of the baggage 0 into the first gap 10 may be accelerated by the downward frictional force. However, at the time of the entrance of the part of the baggage 0, the part of the baggage 0 is brought into contact with an upper end of the jam suppressing unit 51. The jam suppressing unit 51 is bent by the contact and delays the entrance of the part of the baggage 0 into the first gap 10 by using a restoring force caused by elastic bending. At the same time, a part of the baggage 0 is transferred onto the second belt 35. The part of the baggage 0 is transported upwardly by a pulling force. Therefore, the present baggage jam suppressing structure 5 can suppress the baggage 0 from being jammed by interaction with the second conveyor 3.

Meanwhile, as illustrated in FIG. 4, a direction in which the jam suppressing unit 51 is bent when being in contact with the baggage 0 entering into the first gap 10 may be a transport direction of the baggage 0, but may not be limited thereto. The jam suppressing unit 51 may be bent in the opposite direction to a transport direction of the baggage 0 depending on a status of contact with the baggage 0.

Further, as illustrated in FIG. 5, if a part of the baggage 0 enters into the second gap 30, the part of the baggage 0 may be transported upwardly by an upward frictional force and a pulling force. Herein, the upward frictional force refers to a frictional force applied in an upward direction between the part of the baggage 0 and the second belt 35 of the second conveyor 3 of which the entrance is blocked by elastic bending of the jam suppressing unit 51 and which is rotated in a clockwise direction. The pulling force refers to a pulling force applied when the baggage 0 is transferred onto the second conveyor 3.

That is, the jam suppressing unit 51 suppresses the entrance of a part or whole of the baggage 0 into the jam threshold point or extends a time to reach the jam threshold point. Therefore, the baggage 0 can be transferred from the first conveyor 1 to the second conveyor 3 by interaction between the first conveyor 1 and the second conveyor 3.

The jam suppressing unit 51 may have an elastic bending property.

Referring to the above description, when the jam suppressing unit 51 is bent by a contact with the baggage 0, the elastic bending property may be a property of returning the jam suppressing unit 51 to its original position. Referring to FIG. 4 and FIG. 5, the elastic bending property enables the jam suppressing unit 51 to secure a restoring force for supporting or pushing up the baggage 0 when being in contact with the baggage 0.

Referring to FIG. 3, the jam suppressing unit 51 may be a brush.

As illustrated in FIG. 3, the jam suppressing unit 51 may be a brush including multiple hairs. Herein, the hairs may have an elastic bending property.

The jam suppressing unit 51 may be formed of a material including one or more of PVC and Tetron™. If the jam suppressing unit 51 is a brush, each of hairs included in the brush may have an elastic bending property and may be formed of a material including one or more of PVC and Tetron™.

Otherwise, although not illustrated in the drawings, the jam suppressing unit 51 may have a plate shape interposed between the first conveyor 1 and the second conveyor 3. Even if the jam suppressing unit 51 has a plate shape, the jam suppressing unit 51 may have an elastic bending property and may be formed of a material including one or more of PVC and Tetron™.

Further, referring to FIG. 1 to FIG. 5, the present baggage jam suppressing structure 5 may include a mounting unit 53 to which the jam suppressing unit 51 is fixed.

Referring to FIG. 1, the present baggage jam suppressing structure 5 may be provided between the first conveyor 1 and the second conveyor 3 since the mounting unit 53 is fixed to one or more of a first vertical frame 19 configured to support a first conveyor frame 17, in which the first conveyor 1 is provided, from the ground and a second vertical frame 39 configured to support a second conveyor frame 37, in which the second conveyor 3 is provided, from the ground.

However, desirably, the mounting unit 53 may be fixed to one of the first conveyor 1 and the second conveyor 3 in order to suppress mutual interference between the first conveyor 1 and the second conveyor 3. Meanwhile, FIG. 1 of the present disclosure illustrates that the mounting unit 53 is fixed to the second vertical frame 39.

Further, referring to FIG. 1, the mounting unit 53 may be fixed to one or more of the first vertical frame 19 and the second vertical frame 39 via an auxiliary member 59. For example, as illustrated in FIG. 1, the mounting unit 53 may be fixed to the second vertical frame 39 via the auxiliary member 59.

As illustrated in FIG. 3, the mounting unit 53 may include a holder 531 connected with the jam suppressing unit 51.

Further, referring to FIG. 1 to FIG. 5, the present baggage jam suppressing structure 5 may include a mounting part 533 to which the holder 531 is detachably attached.

For example, the holder 531 may be attached to and detached from the mounting part 533 by a sliding movement in a transverse direction.

Referring to FIG. 3, the transverse direction refers to left and right directions. For reference, in FIG. 3, the 9 o'clock direction is the left direction and the 3 o'clock direction is the right direction.

Thus, for example, referring to FIG. 3, the holder 531 may slide from a left end of the mounting part 533 toward the right direction along the transverse direction of the mounting part 533 and thus may be attached to the mounting part 533. Otherwise, the holder 531 may slide from a right end of the mounting part 533 toward the left direction along the transverse direction of the mounting part 533 and thus may be attached to the mounting part 533.

In order to implement such a sliding movement, for example, referring to FIG. 1, FIG. 4, and FIG. 5, any one of the holder 531 and the mounting part 533 includes a groove 5311 on a contact surface along the transverse direction. The other one may include a protrusion 5331 engaged with the groove by the sliding movement.

As such, the holder 531 is attached to the mounting part 533 by a sliding movement in the transverse direction, whereas the baggage 0 mainly applies an acting force to the jam suppressing unit 51 in a direction (left and right directions in FIG. 4 and FIG. 5) orthogonal to the transverse direction while being transported in the direction orthogonal to the transverse direction. That is, the holder 531 is attached by a sliding movement in a transverse direction orthogonal to the transport direction of the baggage 0. Therefore, the holder 531 can be firmly fixed between the first conveyor 1 and the second conveyor 3 without deviation caused by an acting force applied when the baggage 0 is transported.

Meanwhile, the groove 5311 may have a shape for suppressing upward deviation of the holder 531 from the mounting part 533.

For example, as illustrated in FIG. 4 and FIG. 5, the groove 5311 may have an opening narrower than its inner space. Since the groove 5311 has the opening narrower than the inner space, the holder 531 and the mounting part 533 can be released from each other only by a sliding movement in the transverse direction. Therefore, the present baggage jam suppressing structure 5 can be firmly provided between the first conveyor 1 and the second conveyor 3.

Meanwhile, in the belt conveyor device according to an exemplary embodiment of the present disclosure, multiple conveyors are aligned in series to transport baggage. Herein, when the multiple conveyors are aligned in series, they are not necessarily aligned along a linear path, but may be aligned along a curved path or may be aligned along a combination of a linear path and a curved path. Further, the multiple conveyors may be aligned in series to have a slope gradient changed along a path.

The belt conveyor device according to an exemplary embodiment of the present disclosure includes the above-described present baggage jam suppressing structure. To be specific, according to the above description in which the baggage jam suppressing structure is arranged at the gap between the first conveyor 1 and the second conveyor 3, the present baggage jam suppressing structure may be provided at one or more gaps between belt conveyors included in the belt conveyor device according to an exemplary embodiment of the present disclosure. Desirably, the present baggage jam suppressing structure may be provided at each gap between multiple belt conveyors.

The above description of the present disclosure is provided for the purpose of illustration, and it would be understood by those skilled in the art that various changes and modifications may be made without changing technical conception and essential features of the present disclosure. Thus, it is clear that the above-described embodiments are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

We claim:

1. A structure for suppressing a baggage jam, which is applied to a belt conveyor device in which multiple conveyors are aligned to transport baggage, the structure comprising:
   a jam suppressing unit which is provided at a gap between a first conveyor and a second conveyor to suppress baggage transferred from the first conveyor to the second conveyor from being jammed in the gap; and
   a mounting unit to which the jam suppressing unit is fixed,
   wherein the jam suppressing unit is provided to be protruded to a position higher than a jam threshold point having a narrowest space in the gap and lower than a transport surface on which the baggage is transported by the first and second conveyors, has a thickness which is smaller than the narrowest space, and has a brush shape or a plate shape having an elastic bending property of restoring an original position of the jam suppressing unit after being bent by a contact with the baggage,
   the mounting unit includes a holder connected with the jam suppressing unit and a mounting part to which the holder is detachably attached,
   one of the holder and the mounting part includes a groove, and the other one includes a protrusion engaged with the groove by a sliding movement, wherein the groove has an opening narrower than an inner space thereof, and the protrusion has a neck portion corresponding the opening, the neck portion being thinner than a remaining portion thereof, and
   the jam suppressing unit has a thickness at the jam threshold point, the thickness forming a first gap between the jam suppressing unit and the first conveyor and a second gap between the jam suppressing unit and the second conveyor.

2. The structure of claim 1, wherein the jam suppressing unit is formed of a material including PVC (Polyvinyl chloride).

3. The structure of claim 1, wherein the holder is attachable to and detachable from the mounting part by the sliding movement in a transverse direction.

4. The structure of claim 1, wherein the groove has a shape for suppressing upward deviation of the holder from the mounting part.

5. A belt conveyor device comprising the structure for suppressing a baggage jam of claim 1.

* * * * *